United States Patent [19]
Rudd et al.

[11] Patent Number: 6,049,384
[45] Date of Patent: *Apr. 11, 2000

[54] METHOD AND APPARATUS FOR THREE DIMENSIONAL IMAGING USING MULTI-PHASED STRUCTURED LIGHT

[75] Inventors: Eric P. Rudd, Hopkins; David Fishbaine, Minnetonka; Paul R. Haugen, Bloomington; David M. Kranz, Minneapolis, all of Minn.

[73] Assignee: CyberOptics Corporation, Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,380

[22] Filed: Mar. 18, 1997

Related U.S. Application Data

[63] Continuation of application No. 08/607,508, Feb. 27, 1996, abandoned.

[51] Int. Cl.[7] .................................................. G01B 21/22
[52] U.S. Cl. ........................... 356/376; 356/372; 356/235
[58] Field of Search .................................... 356/376, 372, 356/235

[56] References Cited

U.S. PATENT DOCUMENTS

| | | | |
|---|---|---|---|
| 3,614,237 | 10/1971 | Kyle et al. | 356/120 |
| 3,627,427 | 12/1971 | Johnson | 356/120 |
| 4,248,532 | 2/1981 | Nosler . | |
| 4,641,972 | 2/1987 | Halioua et al. . | |
| 4,657,394 | 4/1987 | Halioua . | |
| 4,811,410 | 3/1989 | Amir et al. . | |
| 4,929,845 | 5/1990 | Amir et al. . | |
| 4,965,665 | 10/1990 | Amir . | |
| 5,048,965 | 9/1991 | Amir . | |
| 5,075,559 | 12/1991 | Amir . | |
| 5,097,516 | 3/1992 | Amir . | |
| 5,101,442 | 3/1992 | Amir . | |
| 5,127,061 | 6/1992 | Amir et al. . | |
| 5,319,445 | 6/1994 | Fitts . | |
| 5,465,152 | 11/1995 | Bilodeau et al. . | |
| 5,471,308 | 11/1995 | Zeien | 356/376 |
| 5,646,733 | 7/1997 | Bieman . | |

OTHER PUBLICATIONS

Robinson, David W. and Reid, Graeme T., "Interferogram Analysis, Digital Fringe Pattern Measurement Techniques," Institute of Physics Publishing, Ltd. 1993, pp. 166–186.

Xian–Yu Su et al., Automated phase–measuring profilometry using defocused projection of a Ronchi grating, *Optics Communications* 94 (1992), pp. 561–573.

Xian–Yu Su et al., Phase–stepping grating profilometry: utilization of intensity modulation analysis in complex objects evaluation, *Optics Communications* 98 (1993), pp. 141–150.

*Primary Examiner*—Frank G. Font
*Assistant Examiner*—R. A. Ratliff
*Attorney, Agent, or Firm*—Patterson & Keough, P.A.

[57] ABSTRACT

An apparatus for three dimensional imaging using multi-phased structured light. Measurement of dimensions as small as two hundred microns within one percent accuracy is possible, and multiple scans of a target object, such as the solder pads on an electronic circuit board substrate, are not required. A light source, having a pair of synchronized lamps and a specially designed reticle, projects two different phases of structured light onto a target object. The two phases are projected nearly instantaneously, and the detector is able to discriminate between the two exposures presented by the two out of phase illuminations. The method for presenting the three dimensional image uses filtering techniques and certain assumptions to resolve intensity equations having three unknowns from the two exposures of out of phase structured light.

33 Claims, 2 Drawing Sheets

METHOD AND APPARATUS FOR THREE DIMENSIONAL IMAGING USING MULTI-PHASED STRUCTURED LIGHT

This is a Continuation Ser. No. 08/607,508 filed Feb. 27, 1996 now abandoned.

TECHNICAL FIELD

This invention relates to the measurement of surface contours of an object using optical measurements of light reflected from the surface of the object. More particularly, it relates to a method and apparatus for three dimensional imaging of a substrate through the use of multi-phased structured light. The invention is particularly useful for inspecting solder paste layouts on electronic circuit boards during the circuit board fabrication process.

BACKGROUND ART

Circuit boards that carry integrated electronic circuits as well as discrete electronic components are well known. A circuit board substrate is prepared with predetermined conductor paths and pads for receiving the leads of electronic components such as integrated circuit chips, resistors or capacitors. During the circuit board fabrication process, solder paste bricks are placed onto the board substrate at appropriate positions. The solder paste is usually applied by placing a screen onto the substrate, applying solder paste through the screen openings, wiping the excess solder paste from the screen surface, and removing the screen from the substrate. The circuit board electronic components are then positioned onto the substrate, preferably with a pick and place machine, with the leads of the electronic components placed on their respective, appropriate solder paste bricks. The circuit board is passed through an oven after all of the components are positioned on the substrate, to melt the solder paste and make an electrical and mechanical connection between the components and the substrate.

The size of the solder paste bricks, and the accuracy with which they must be placed on the substrate, have become increasingly smaller and tighter with the increased emphasis on miniaturization in the electronics industry. Solder paste brick heights can be as small as two hundred microns, and the height of the solder paste brick must often be measured to within one percent of the designed height and size. Too little solder paste can result in the failure to provide an electrical connection between the lead of an electronic component and the pad of the circuit board substrate. Too much paste can result in bridging and short circuiting between the leads of a component.

A single circuit board can cost thousands and even tens of thousands of dollars to manufacture. Testing of a circuit board after the fabrication process is complete can detect errors in solder paste placement and component lead connection, but often the only remedy for a faulty board is rejection of the board. It is accordingly imperative that a circuit board be inspected during the fabrication process, so that improper solder paste placement can be detected prior to the placement of electronic components onto the substrate.

U.S. Pat. No. 5,101,442 granted to Amir for Three Dimensional Imaging Technique Using Sharp Gradient of Illumination discloses a method and apparatus for obtaining a three dimensional image of a substrate in accordance with the gradient of the intensity of the structured light reflected from the substrate surface. A first stripe of light is projected onto the surface of a target object and the object is scanned through the light stripe while the intensity of the light reflected from the surface is measured by a detector. The scanning process is repeated with a second stripe of light, but with the second stripe being offset from the position of the first light stripe.

The reflectance intensities of the beams of light used in the apparatus disclosed by Amir are assumed to be linear such that the distance of a spot on the surface from the longitudinal center of the light beams is linearly related to the intensity of light reflected from that spot. Because the beams of light strike the surface of the target object at an angle, the lateral position of a spot on the surface relative to the beam center is a function of the height of the spot, and the intensity of the light received by the detector from the spot will differ as a function of height.

The apparatus disclosed by Amir requires two scans from two offset beams of light, because the intensity of the light received by the detector will be a product of both the intensity of the illumination and the reflectance of the surface of the target. The surface reflectance of a circuit board varies greatly between the areas of bare substrate and solder paste pads, and accordingly cannot be assumed to be a constant. It is the variations in illumination, not surface reflectance, that indicate height, and two scans are required to gather enough data to solve for the two unknowns.

Scanning a circuit board substrate to obtain a three dimensional image takes time, and scanning the board twice takes double that time. Moreover, taking two scans of a target object assumes no movement of the object between the scans, requires tight calibration of the offset light sources, and accordingly makes the process vulnerable to vibration. An apparatus and method that obtained three dimensional images of target objects without the requirement for multiple scans, and that could distinguish dimensions of as small as two hundred microns within one percent accuracy, would provide decided advantages.

SUMMARY OF INVENTION

The problems outlined above are in large measure solved by the method and apparatus for three dimensional imaging using multi-phased structured light in accordance with the present invention. The method and apparatus hereof provide three dimensional imaging of target objects such as electronic circuit boards. The resolution and accuracy allows for inspection, for instance, of circuit board solder paste pads during the circuit board fabrication process. Measurement of dimensions as small as two hundred microns within one percent accuracy is possible, and multiple scans of the target object are not required.

The apparatus hereof employs a 640×240 CCD array as a detector. A light source, having a pair of synchronized lamps and a specially designed reticle, projects two different phases of structured light onto a target object. The two phases are projected nearly instantaneously, and the detector is able to discriminate between the two exposures presented by the two out of phase illuminations. The method for presenting the three dimensional image uses filtering techniques and certain assumptions to resolve the intensity equations having three unknowns from the two exposures of out of phase structured light.

DETAILED DESCRIPTION

Figure 1:
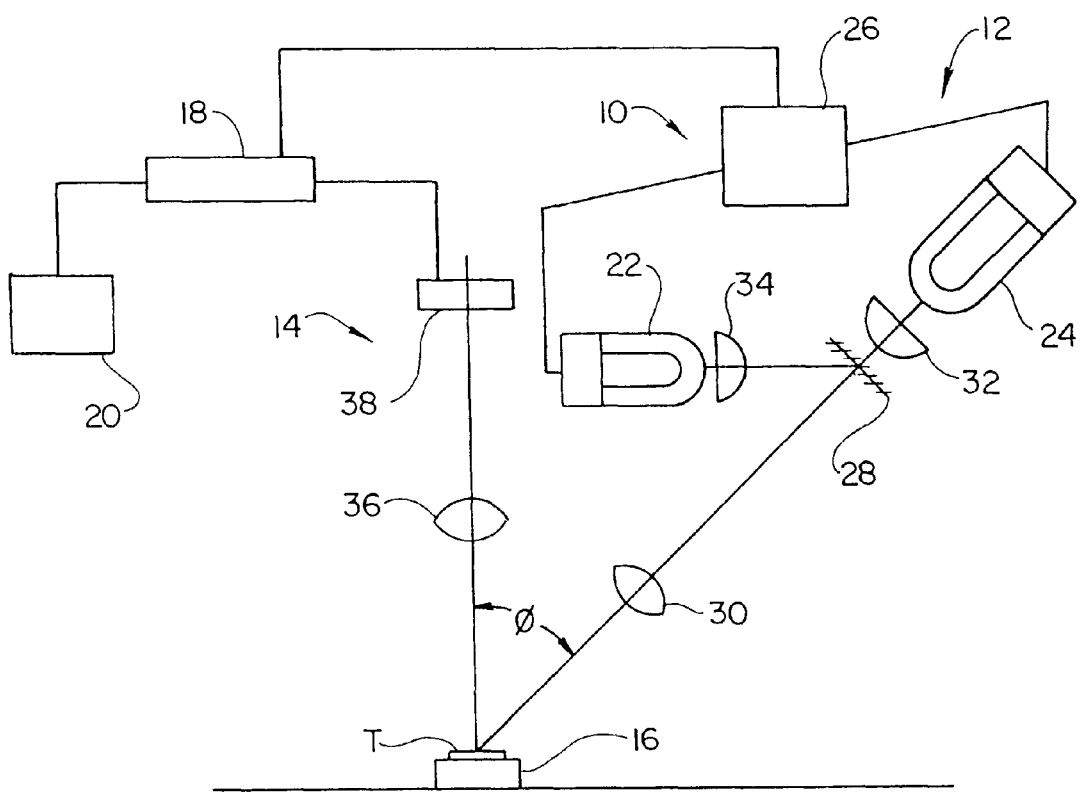
FIG. 1 is a schematic diagram of an imaging system in accordance with the present invention for obtaining a three dimensional image of a target object using multi-phased structured light.

An apparatus 10 for three dimensional imaging using multi-phased structured light is depicted schematically in FIG. 1, and includes light source 12, imaging system 14, platform 16, processor 18, and display terminal 20. Display terminal 20 can be a video terminal or printer, providing either a visual image reconstruction or quantitative data as output.

The light source 12 includes a pair of lamps 22, 24 coupled to a lamp timing circuit 26, a reticle 28, and projection lens 30. A condenser lens 32, 34 is associated with each lamp 22, 24. The lamp is a xenon strobe of conventional design, having a discharge time of a few microseconds.

Figure 3:
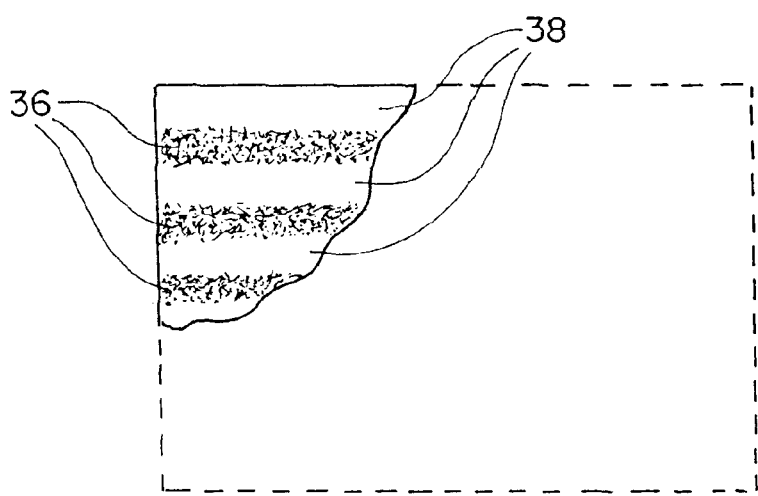
FIG. 3 is a fragmentary plan view depicting the reticle of the imaging system light source.

The reticle 28 is schematically depicted in FIG. 3. The reticle has alternating areas of metallized 36 and clear 38 stripes. The metallized areas are actually made up from a pseudo random distribution of dots, with the density of the dots carefully controlled such that the metallized and clear areas of the reticle vary in opacity in a sinusoidal manner. The distribution of dots can be produced from a continuous tone original by a variant of the well known technique of error diffusion, as described by Velho and Gomes. (Velho, Luiz and Jonas de Miranda Gomes, "Digital Halftoning with Space Filling Curves," *Computer Graphics* 25(4) (1991 July) 81–90.)

Light passing through the reticle 28 is accordingly structured in a plurality of dark and light stripes that vary in intensity in the same manner as the opacity of the stripes 36, 38 of the reticle 28, with the light passing through the clear areas 38 of the reticle 28 having greater intensity than light that passes through the metallized areas 36 of the reticle 28. In the same manner, light that is reflected off of the reticle varies sinusoidally in intensity, but with light reflecting off of the metallized areas of the reticle being more intense than the light reflecting off of the clearer areas of the reticle (since more of the light impinging on the clear areas will pass through the reticle rather than be reflected by it).

Referring to FIG. 1, light is projected onto the platform 16 along a path of travel, originating from lamp 24 and passing through condenser lens 32 and reticle 28, at a triangulation angle ø relative to a path of travel from the target, through the lens 36 to the detector 38. The triangulation angle ø would typically be between 15° and 30°. If the triangulation angle ø is too small, the detector will be operating near the specular angle, which can result in undesirable specular glints from slightly tilted, smooth surfaces. If the triangulation angle ø is too large, the shadows cast onto the target will be excessively long. Since practically no light is reflected to the detector from the shadows, height readings from the shadows are heavily contaminated by noise.

The light pattern projected onto the platform will be analogous to the pattern of dark and light areas cast onto a floor by sunlight passing through a Venetian blind. Just as the sunlight passing through a Venetian blind will present a pattern of parallel, straight stripes on a flat floor, the pattern of the light on the flat platform 16 will be one of parallel, straight stripes, but varying in intensity according to the sinusoidal pattern of opacity of the reticle.

Continuing the analogy to sunlight passing through a Venetian blind, it will be understood that the pattern of stripes of sunlight will be shifted laterally if they strike an object (like a sleeping cat) having a height different from the height of the flat floor. Similarly, because the light is projected onto the platform 16 at an angle to the plane of the platform 16, the pattern of stripes presented on the platform 16 is shifted laterally in the presence of an object having a height different from the height of the plane of the platform 16.

Again referring, to FIG. 1, light originating from lamp 22 and passing through the condenser lens 34, is reflected off of the reticle 28 and onto the platform 16. Similarly to the pattern of light that passes through the reticle 28 from the lamp 24, the pattern of light reflected onto the platform from lamp 22 will present a structured, sinusoidal pattern. It will be appreciated, however, that the pattern of light intensity reflected by the reticle 28 onto the platform 16 will be 180° out of phase from the pattern of light intensity projected through the reticle 28 from lamp 24.

The phase difference between light passed through the reticle 28 as compared to light reflected off of the reticle is exactly 180°, because the metallized areas 36 of the reticle will have the greatest reflectance of light directed at the reticle 28 from lamp 22, and will block more light directed at the reticle from lamp 24. The lamp 22 is oriented with respect to lamp 24 and reticle 28 such that the path of the light reflected off of the reticle 28 from lamp 22 is the same as the path of the light that passes through the reticle 28 from lamp 24. It will be appreciated that the two patterns are exactly aligned, 180° out of phase, since they are generated from a single reticle by reflection and transmission.

Referring to FIG. 1, the reticle 28 is canted relative to the line of sight of the lamp 24, lens 30, and platform 30 in accordance with the Scheimpflug condition, such that each of the lines of the structured light projected onto the platform 16 are focused in the plane of the platform 16. The cant of the reticle 28 also provides for placement of the lamp 22 out of the line of sight of lamp 24, lens 30, and platform 16.

As noted above, the triangulation angle ø (the angle of attack of the projected light onto the target relative to the path of the light reflected from the target to the detector) would typically be between 15° and 30°. The precise triangulation angle ø would be selected to obtain a desired fringe frequency and phase wrap height, it being understood that the optimal fringe frequency and phase wrap height for a given application would be a function of the range of dimensions being measured and the tolerance accuracy desired.

More particularly, it being recalled that the reticle 28 varies in opacity in a sinusoidal manner, the fringe frequency is the frequency of the sinusoidal pattern projected onto the target. Because the target is three dimensional, the fringe spatial frequency will have three components along the three cartesian coordinates, $f_x$, $f_y$, $f_z$ that are related to the triangulation angle ø according to the following relationship:

$$\tan \varnothing = \frac{f_z}{\sqrt{f_x^2 + f_y^2}} \quad (1)$$

Performance requirements impose the following constraints on the selection of the triangulation angle and fringe frequency:

The phase wrap height is the reciprocal of $f_z$, and is the height increment corresponding to a phase shift of $2\pi$. The phase wrap height must be at least twice as high as the tallest feature on the target object, unless phase unwrapping is performed.

It is necessary to filter the image when performing a two phased reconstruction. If a triangular kernel, for instance, is used to filter along the x-axis, its length is $2/f_x$. If $f_x$ is too small, the kernel will be excessively long and will smear the height features to an unacceptable degree. Thus a large $f_x$ or $f_y$ is desirable, depending on the desired filtering direction. For an unfiltered three-phase reconstruction, the size of $f_x$ is not relevant.

If the triangulation angle ø is too small, the sensor will be operating near the specular angle. This can result in undesirable specular glints from slightly tilted, smooth surfaces.

If the triangulation angle ø is too large, the shadows cast will be excessively long. The problem is that since practically no light is returned n the shadows, the height reading in the shadows are heavily contaminated by noise.

The success of reconstructing a three dimensional image using two phased structured light depends on whether the constraints on the triangulation angle ø and fringe frequency leave a feasible operating region. Successful implementation requires some compromise between the various factors. A triangulation angle ø=15°, and fringe frequencies of $f_x=f_y=4$ cycles/mm and $f_z=1.5$ cycles/mm have been found to produce satisfactory results.

Figure 2:
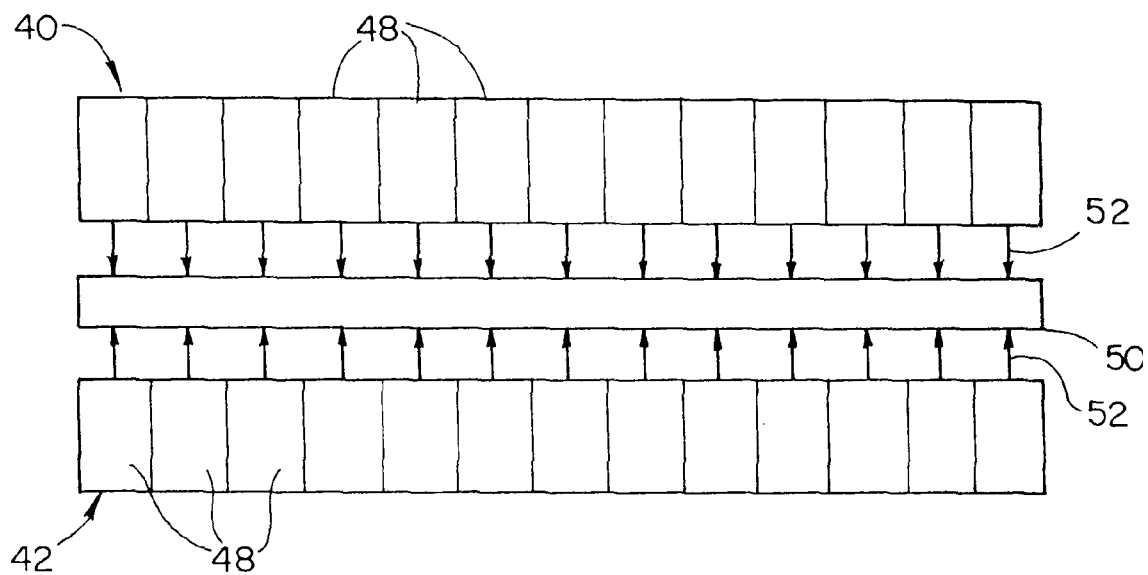
FIG. 2 is a schematic diagram depicting two rows of the CCD array of the detector used by the imaging system.

Imaging system 14 includes receiving lens 36 and a two dimensional CCD array 38. A preferred CCD array comprises a 640×240 array of CCDs. Referring to FIG. 2, two rows 40, 42 of photosites 48 making up the CCD array are depicted in schematic form. Each CCD photosite 48 comprises a pixel, responsive to the intensity of light projected through the receiving lens 36. A shift register 50 is associated with each pair of adjacent CCD rows, with electronic transfer paths 52 extending between the individual CCD photosites 48 and the shift register 50.

The output voltage of each CCD photosite 48 is a linear function of the intensity of the light projected onto the photosite 48. The output voltage of each of the photosites 48 in a row of CCDs can be transferred in parallel to the shift register 50, and the shift register can then be serially read into the processor 18. Within the processor, the CCD output data is converted from analog readings to digital format for processing of the information as described in detail below. It will be appreciated that data can be transferred from a CCD row into a respective shift register in the very short time interval of about 1–2 µsec, although it takes considerably longer, in the order of 1/60 sec., to read the contents of all the shift registers into the processor.

Timer 26 controls the activation of the lamps 14, 22 in a manner that takes advantage of the short time interval required to read data from the CCD rows 40, 42 to a shift register 50. The lamp 14, for instance, can be flashed on, to expose a target on the platform 16, with the exposure voltages generated in the CCD photosites 48 from the light reflected by the target being immediately shifted to the shift register 50. The second lamp 22 is then flashed on to reexpose the target, generating a second set of exposure voltages in the CCD photosites 48. In effect, two sets of exposure voltages, taken within 1–2 µsec of each other, are temporarily stored in the CCD array; one set in the shift register 50, and the second set in the CCD photosites. The first set of exposure voltages are then read into the processor 18 from the shift register 50, the second set of exposure voltages are then read into the shift register 50 and then to the processor 18, and the exposure process is repeated.

It will be appreciated, as explained above, that the phase of the intensity of the structured light projected onto the target from the lamp 22 is 180° out of phase from the phase of the intensity of the structured light projected onto the target from the lamp 24. Because the two out of phase exposures are accomplished in the extremely short time interval of 1–2 µsec, the effect is to have near instantaneous exposures of the target with multi-phased structured light.

The length and width of the CCD array is approximately 9 millimeters by 6 millimeters. Assuming that the exposure target is a circuit board substrate, it is possible to take several exposures at different areas of the substrate, obtain accurate three dimensional imaging of the exposed areas in the manner described below, and make quality control decisions based on the processed data during the circuit board fabrication process.

There are approximately 150,000 pixels in a 640×240 CCD array. As described above, however, in order to effect the near instantaneous illumination of a target by two different phases of structured light, the photosite voltages generated in each adjacent pair of CCD photosite rows 40, 42 are immediately read into the shift register 50 after exposure of the photosites to the first phase of structured light, to clear the photosites for exposure to the second phase of structured light. The effective pixel dimension of the image generated is accordingly one photosite in width, and two photosites in height.

When a sinusoidal pattern of structured light is projected onto a surface, as is done by the apparatus described above, the intensity of the light i(x,y) that is measured by the detector can be expressed as:

$$i(x,y)=r(x,y)\{1+m(x,y) \cos [\theta(x,y)]\}, \qquad (2)$$

where r(x,y) is the reflectance of the surface, m is the modulation depth and θ(x,y) is the phase angle. The reflectance of the surface of a circuit board substrate including conductor paths and solder paste pads will vary across a fairly wide range. The modulation depth is a measurement of the effects of diffusion of the projected light caused by the surface of the target.

The phase angle θ in Equation (2) relates to the sinusoidal structured pattern of the light projected by lamps 24, 22 through and off of reticle 28 respectively; the value of θ indicating where along a cycle in the sinusoid the received light is positioned. As described above, the lateral position of the stripes of light along the target T carried by platform 16, is a function of the height of the target. Accordingly, if Equation (2) is solved for θ, the various heights of the surface of the target can be determined from the intensity of light received by the detector.

Equation (2) has three unknowns, r, m, and θ, to solve for. Generally, a minimum of three equations are needed to solve for these three unknowns. One way of obtaining the necessary three equations is to make measurements with three phase shifted intensity patterns. While any three phases not related by a integral factor of 360° can be used, one obvious selection would be to use results from three intensity patterns shifted by 120° relative to each other. Then, the following three equations are obtained at each spatial point (x,y):

$$a=r(1+m \cos (\theta+0°)), \qquad (3)$$
$$b=r(1+m \cos (\theta-120°)),$$
$$c=r(1+m \cos (\theta-240°)),$$

where a, b, and c are the intensities measured from the respective light sources. Similar equations will result from the use of other phases.

In principle, Equation set (3) provides the framework for performing accurate surface profilometry measurements. In practice, there are significant cost and implementation advantages for limiting phase profilometry to two phases, as is accomplished by the present invention, instead of the three phases that would be required to solve the three equations of Equation set (3) above. The problem of using two phases, of course, is that Equation set (3) is clearly under determined, since there are only two knowns, a and b, obtained from the measurements, and three unknowns, r, m, and θ.

The apparatus and method in accordance with the present invention accomplishes accurate surface profilometry measurements with only two phase measurements by assuming that the modulation variable m is a constant, and through the use of filtering techniques. Modulation can be assumed to be a constant without affecting accuracy of the measurement because the diffusion of the light projected onto a target substrate is generally small.

With only two phases of measurement, and with modulation assumed to be constant, Equation set (3) is replaced by $$a = r(1 + m \cos \theta) \quad (4)$$

$$b = r[1 + m \cos(\theta + \phi)].$$

For simplicity, the discussion continues with φ=180°. Then, Equation (4) simplifies to $$a = r(1 + m \cos \theta) \quad (5)$$

$$b = r(1 - m \cos \theta).$$

The functions a, b, r, m and θ are functions of the coordinates x and y. From Equation (5), we obtain:

$$m \cos \theta = (a-b)/(a+b). \quad (6)$$

Since m is assumed constant, we should (at least in principle) have a constant-amplitude sinusoid which is phase-modulated. Since m is not known, it is not possible to solve Eq. 5 for θ. However, since m is assumed to be constant, an approximate reconstruction can be obtained by deriving the quantity:

$$v \Delta m \sin \theta \quad (7)$$

by filtering, as discussed in detail below. Then, θ can be simply expressed as $$\theta = a \tan 2(v, u) \quad (8)$$

The challenge of producing v from u remains, but efficient techniques are known. The key is the recognition that u can be written as $$u = \frac{1}{2}[\exp(j\theta) + \exp(-j\theta)] \quad (9)$$

where j is the imaginary unit. Now the necessity of filtering becomes clear. The signal consists of two components, one negative frequency component and one positive frequency component. If the negative frequency component could be removed, the result, by de Moivre's relations is:

$$\exp(j\theta) = \cos \theta + j \sin \theta \quad (10)$$

Thus a filter must be selected that passes the positive frequency component, while rejecting the negative frequency component.

One efficient means of doing this starts with the multiplication of the signal u by the factor $\exp(-j\omega x)$ where $\omega = 2\pi f_x$. This shifts the desired component to the origin, and the undesired component to $\exp(-2j\omega x)$. Then, a filter with a triangular kernel of width 2λ can be applied to the signal. This filter has notches spaced by ω one of which rejects the image and recovers the signal u+jv. The reason a triangular kernel is attractive is that filtering operations are extremely rapid.

Then, θ is found from Equation (8). Knowing θ, one can find the height from the relation:

$$h = 2 \pi f_z \theta. \quad (11)$$

One drawback of this scheme is that the kernel smears the small features of the image. Other kernels exist which have better high frequency response. For instance, a sharp cutoff FIR filter can be arranged to be centered on a more positive frequency, which will pass the large positive frequencies. The penalty for using such a filter is greater computational complexity. In the preferred implementation, the triangular kernel filter is used, since the lateral resolution requirement is modest and computation time can be minimized.

The determination of heights by solving for the phase angle θ as detailed above does not account for phase wrap. Calculation of the phase wrap height ($1/f_z$) as twice the height on the target object, as described above to avoid phase wrap problems, assumes that the substrate is not tilted.

We claim:

1. An apparatus for producing an image of a target object, comprising:
   an energy source for projecting two sequential exposures of energy along a path onto said target object;
   one energy structuring device disposed in said path for structuring said two sequential exposures of energy to be out of phase with each other;
   a detector adapted for receiving the structured energy reflected from the surface of said target object upon each exposure and for producing readings from the detected energy; and
   a processor for producing a three dimensional image of said target object from said readings.

2. The apparatus of claim 1, wherein said two sequential exposures of energy occur nearly simultaneously.

3. The apparatus of claim 1, wherein said one energy structuring device incorporates a single repetitive pattern.

4. The apparatus of claim 1, wherein said one energy structuring device structures said two sequential exposures of energy to be 180° out of phase.

5. The apparatus of claim 1, wherein said two sequential exposures of energy are projected onto said target object at a preselected triangulation angle.

6. The apparatus of claim 5, wherein said triangulation angle is selected to obtain a desired fringe frequency.

7. The apparatus of claim 5, wherein said triangulation angle is in the range of 15° to 30°.

8. The apparatus of claim 1, wherein said one energy structuring device comprises a reticle that varies in opacity in a sinusoidal manner.

9. The apparatus of claim 1, wherein said detector is a two dimensional CCD array.

10. A method for producing an image of a target object, comprising:
    projecting two sequential exposures of energy along a path onto said target object;
    structuring said two sequential exposure of energy to be out of phase with each other with a single energy structuring device disposed in said path;
    detecting the structured energy reflected from the surface of said target object upon each exposure;

producing readings from the detected energy; and producing a three dimensional image of said target object from said readings.

11. The method of claim 10, wherein the step of projecting two sequential exposures of energy along a path onto said target object further comprises projecting said two sequential exposures of energy nearly simultaneously.

12. The method of claim 10, wherein the step of structuring said two sequential exposures of energy to be out of phase with each other comprises structuring said two sequential exposures of energy to be 180° out of phase with each other.

13. The method of claim 10, wherein the step of projecting two sequential exposures of energy along a path onto said target object further comprises projecting the two sequential exposures of energy onto said target at a preselected triangulation angle.

14. The method of claim 13, wherein said preselected triangulation angle is selected to obtain a desired fringe frequency.

15. The method of claim 13, wherein said preselected triangulation angle is in the range of 15° to 30°.

16. An apparatus for producing an image of a target object, comprising:

an energy source for projecting two nearly simultaneous exposures of energy along a path onto said target object;

one energy structuring device incorporating a single repetitive pattern, said one energy structuring device disposed in said path for structuring said two sequential exposures of energy to be out of phase with each other;

a detector adapted for receiving the structured energy reflected from the surface of said target object upon each exposure and for producing readings from the detected energy; and a processor for producing a three dimensional image of said target object from said readings.

17. The apparatus of claim 16, wherein said one energy structuring device structures said two sequential exposures of energy to be 180° out of phase.

18. The apparatus of claim 16, wherein said two nearly simultaneous exposures of energy are projected onto said target object at a preselected triangulation angle.

19. The apparatus of claim 18, wherein said triangulation angle is selected to obtain a desired fringe frequency.

20. The apparatus of claim 18, wherein said triangulation angle is in the range of 15° to 30°.

21. The apparatus of claim 16, wherein said one energy structuring device comprises a reticle that varies in opacity in a sinusoidal manner.

22. The apparatus of claim 16, wherein said detector is a two dimensional CCD array.

23. A method for producing an image of a target object:

projecting two nearly simultaneous exposures of energy along a path onto said target object;

structuring said two nearly simultaneous exposures of energy to be out of phase with each other by using one energy structuring device incorporating a single repetitive pattern that is disposed in said path;

detecting the structured energy reflected from the surface of said target object upon each exposure;

producing readings from the detected energy; and producing a three dimensional image of said target object from said readings.

24. The method of claim 23, wherein the step of projecting two nearly simultaneous exposures of energy along a path onto said target object further comprises projecting said two nearly simultaneous exposures of energy onto said target at a preselected triangulation angle.

25. The method of claim 24, wherein said preselected triangulation angle is selected to obtain a desired fringe frequency.

26. The method of claim 24, wherein said preselected triangulation angle is in the range of 15° to 30°.

27. The method of claim 23, wherein the step of structuring said two nearly simultaneous exposures of energy to be out of phase with each other comprises structuring said two nearly simultaneous exposures of energy to be 180° out of phase with each other.

28. The apparatus of claim 1, wherein said one energy structuring device creates a sinusoidal spatial variation in said two sequential exposures of energy.

29. The apparatus of claim 16, wherein said one energy structuring device creates a sinusoidal spatial variation in said two sequential exposures of energy.

30. The apparatus of claim 1, wherein said one energy structuring device is further designed for producing two fringe patterns on said target object that are 180° out of phase.

31. The apparatus of claim 16, wherein said one energy structuring device is further designed for producing two fringe patterns on said target object that are 180° out of phase.

32. The apparatus of claim 1, wherein said one energy structuring device comprises a reticle that varies in reflectivity in a sinusoidal manner.

33. The apparatus of claim 16, wherein said one energy structuring device comprises a reticle that varies in reflectivity in a sinusoidal manner.

* * * * *